(12) United States Patent
Cho et al.

(10) Patent No.: US 8,165,647 B2
(45) Date of Patent: Apr. 24, 2012

(54) PORTABLE TERMINAL

(75) Inventors: Choong-Hyoun Cho, Seoul (KR);
Jae-Wook Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 12/466,394

(22) Filed: May 15, 2009

(65) Prior Publication Data

US 2010/0093410 A1 Apr. 15, 2010

(30) Foreign Application Priority Data

Oct. 14, 2008 (KR) .......................... 10-2008-0100790

(51) Int. Cl.
*H04M 1/00* (2006.01)
(52) U.S. Cl. ................ 455/575.3; 455/575.1; 455/575.8
(58) Field of Classification Search ............... 455/575.1, 455/575.3, 575.8
See application file for complete search history.

(56) References Cited

U.S. PATENT DOCUMENTS

| 7,876,288 B1 * | 1/2011 | Huang .............................. 345/4 |
| 2007/0111750 A1 * | 5/2007 | Stohr et al. ................. 455/550.1 |
| 2008/0309640 A1 * | 12/2008 | Hong ............................ 345/173 |

\* cited by examiner

*Primary Examiner* — Anh Tran
(74) *Attorney, Agent, or Firm* — Birch, Stewart, Kolasch & Birch, LLP

(57) ABSTRACT

A mobile terminal including a front body, a rear body slidably coupled to the front body such that the front and rear bodies are slidable between a closed position and an opened position, at least one of the front body and rear body including a transparent portion that can be can seen through, a wireless communication unit disposed in the front body and configured to wirelessly communication with at least one other terminal, and an transparent input module disposed in the transparent portion and configured to input information into the mobile terminal.

21 Claims, 16 Drawing Sheets

PORTABLE TERMINAL

CROSS-REFERENCE TO A RELATED APPLICATION

The present application claims priority to Korean Application No. 10-2008-0100790, filed in Korea on Oct. 14, 2008, the entire contents of which is herein incorporated by reference in its entirety.

BACKGROUND OF THE INVENTION

1. Field of the Invention

The present invention relates to a portable terminal with a transparent region and corresponding method of displaying information through the transparent region.

2. Background of the Invention

A portable terminal is a device that may be carried around and performs a variety of functions such as voice and telephony call communications, input and/or output of information, storing data and the like. The portable terminal also now provides additional functions such as allowing a user to capture still images or video, play music or video files, play games, receive broadcast signals and the like. Thus, the portable terminal functions as a multimedia player or device.

In addition, the portable terminals include a complex user interface allowing the user to traverse through and select various functions on the terminal. Further, because the terminal is small in size, the display region is often cluttered with various icons, etc. Many electrical components are also included within the terminal, which increases the thickness and size of the terminal.

SUMMARY OF THE INVENTION

Accordingly, one object of the present invention is to address the above-noted and other problems.

Another object of the present invention is to provide an improved aesthetic effect by forming a portable terminal having at least a partial transparent region.

Another object of the present invention is to minimize a relative reduction of an installation space for other components even when a transparent region is used, and allow a portable terminal to be slim and light.

To achieve these and other advantages and in accordance with the purpose of the present invention, as embodied and broadly described herein, the present invention provides in one aspect a mobile terminal including a front body, a rear body slidably coupled to the front body such that the front and rear bodies are slidable between a closed position and an opened position, at least one of the front body and rear body including a transparent portion that can be can seen through, a wireless communication unit disposed in the front body and configured to wirelessly communication with at least one other terminal, and an transparent input module disposed in the transparent portion and configured to input information into the mobile terminal.

In another aspect, the present invention provides a portable terminal including a main body, a wireless communication unit disposed in the main body and configured to wirelessly communicate with at least one other terminal, and a transparent input module that can be can seen through installed on an edge portion of the main body.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

A terminal described in the present invention may be implemented using different types of terminals. Examples of such terminals include mobile phones, smart phones, notebook computers, digital broadcast terminals, Personal Digital Assistants (PDAs), Portable Multimedia Players (PMPs), navigators and the like, and stationary terminals, such as digital TVs, desktop computers and the like. The following description assumes that the terminal is a portable terminal. However, the embodiments of the present invention can also be applied to the stationary terminals.

Figure 1:
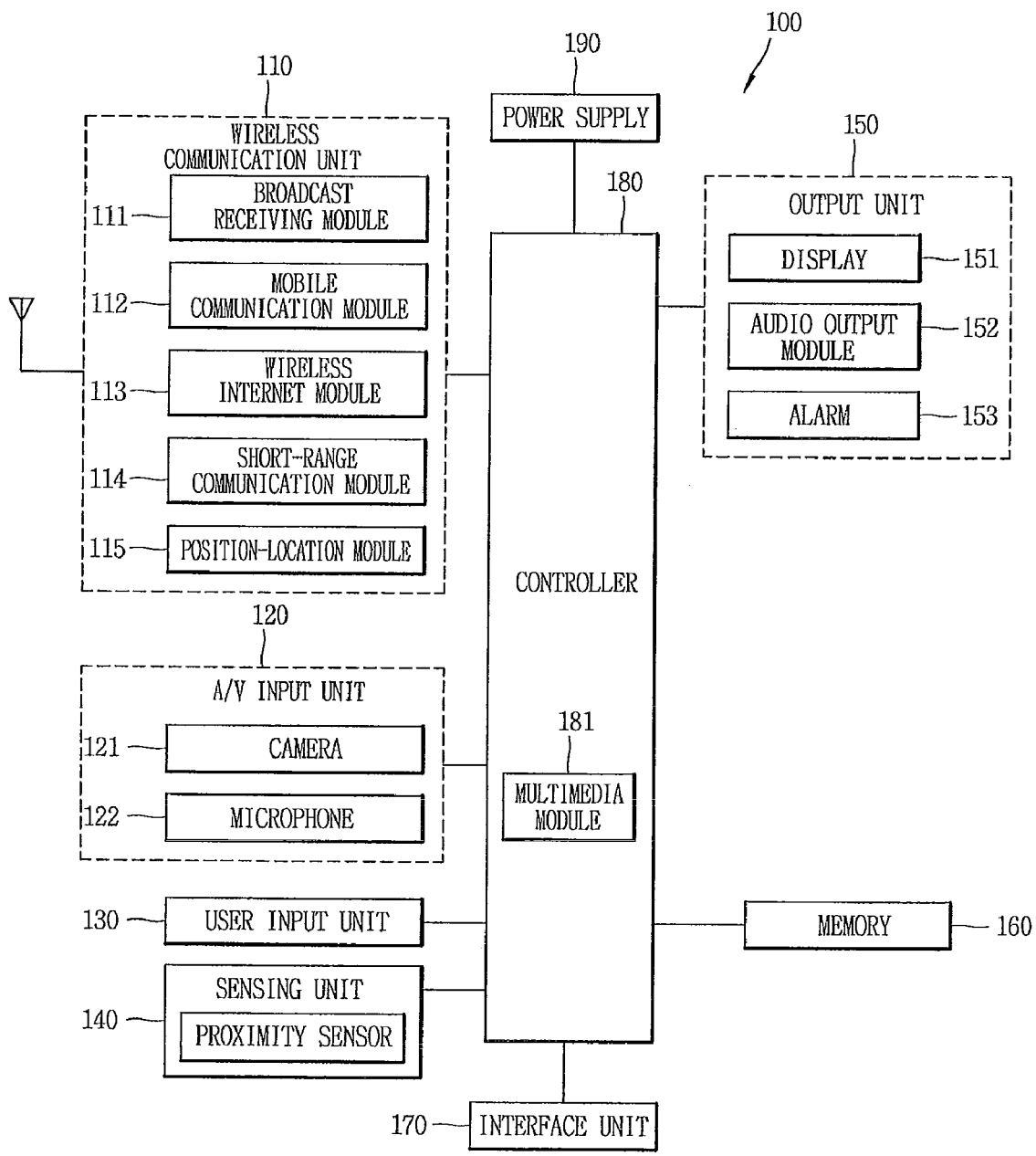
FIG. 1 is a block diagram of a portable terminal in accordance with an embodiment of the present invention.

Turning first to FIG. 1, which is a block diagram of a portable terminal 100 in accordance with an embodiment of the present invention. As shown in FIG. 1, the portable terminal 100 includes a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the portable terminal 100 having various components, however implementing all of the illustrated components is not a requirement. Greater or fewer components may alternatively be implemented.

The wireless communication unit 110 includes one or more components which permit wireless communications between the portable terminal 100 and a wireless communication system or between the portable terminal 100 and a network within which the portable terminal 100 is located. For example, in FIG. 1, the wireless communication unit 110 includes a broadcast receiving module 111, a mobile communication module 112, a wireless Internet module 113, a short-range communication module 114, a position location module 115 and the like.

The broadcast receiving module 111 receives a broadcast signal and/or broadcast associated information from an external broadcast managing entity via a broadcast channel. In addition, the broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. Further, the broadcast associated information may indicate information relating to broadcast channels, broadcast programs or broadcast service providers. The broadcast signal may be implemented as a TV broadcast signal, a radio broadcast signal, and a data broadcast signal, among others. The broadcast signal may further include a data broadcast signal combined with a TV or radio broadcast signal.

In addition, the broadcast associated information may be provided via a mobile communication network and received by the mobile communication module 112. The broadcast associated information may also be implemented in various formats. For instance, the broadcast associated information may include an Electronic Program Guide (EPG) of the Digital Multimedia Broadcasting (DMB) system, an Electronic Service Guide (ESG) of the Digital Video Broadcast-Handheld (DVB-H) system, and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. Further, the broadcast receiving module 111 may be configured to be suitable for all broadcast system transmitting broadcast signals as well as the digital broadcasting systems. In addition, the broadcast signals and/or broadcast associated information received via the broadcast receiving module 111 may be stored in a suitable device, such as the memory 160.

The mobile communication module 112 transmits/receives wireless signals to/from at least one of network entities (e.g., a base station, an external terminal, a server, etc.) on a mobile communication network. The wireless signals may include an audio call signal, video call signal, or various formats of data according to transmission/reception of text/multimedia messages. Further, the wireless Internet module 113 supports wireless Internet access for the portable terminal 100 and may be internally or externally coupled to the portable terminal 100. Examples of such wireless Internet access include Wireless LAN (WLAN) (Wi-Fi), Wireless Broadband (Wibro), World Interoperability for Microwave Access (Wimax), High Speed Downlink Packet Access (HSDPA), and the like. Also, the short-range communication module 114 denotes a module for short-range communications. Suitable technologies for implementing this module include BLUETOOTH, Radio Frequency IDentification (RFID), Infrared Data Association (IrDA), Ultra-WideBand (UWB), ZigBee, and the like.

In addition, the position location module 115 denotes a module for detecting or calculating a position of a portable terminal. An example of the position location module 115 includes a Global Position System (GPS) module, which can measure accurate time and distance respectively from three or more satellites and apply a triangulation scheme to the measured information so as to accurately calculate a three-dimensional current position of the portable terminal 100 on the latitude, longitude and altitude coordinates. A scheme may also be used to obtain time information and distance information from three satellites and correct an error by one satellite. Further, the GPS module 115 can calculate speed information by continuously calculating a current position of the portable terminal 100.

In addition, the A/V input unit 120 is configured to provide an audio or video signal input to the portable terminal, and in FIG. 1 includes a camera 121 and a microphone 122. The camera 121 receives and processes image frames of still pictures or video obtained by image sensors in a video (telephony) call mode or a capturing mode. The processed image frames may be displayed on a display 151 included in the output unit 150. Further, the image frames processed by the camera 121 may be stored in the memory 160 or transmitted to at least one other terminal via the wireless communication unit 110. Two or more cameras 121 may also be provided according to the configuration of the portable terminal.

Further, the microphone 122 may receive an external audio signal while the portable terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the portable terminal. The user input unit 130 may also include a keypad, a dome switch, a touchpad (e.g., static pressure/capacitance), a jog wheel, a jog switch and the like. Further, when the touch pad is layered with the display 151 to cooperate with each other, the display and touch pad are referred to as a touch screen. Also, the sensing unit 140 provides status measurements of various aspects of the portable terminal 100.

For instance, the sensing unit 140 may detect an open/close status of the portable terminal 100, a change in a location of the portable terminal 100, a presence or absence of user contact with the portable terminal 100, the orientation of the portable terminal 100, an acceleration/deceleration of the portable terminal 100, and the like, so as to generate a sensing signal for controlling the operation of the portable terminal 100. For example, regarding a slide-type portable terminal, the sensing unit 140 may sense whether a sliding portion of the portable terminal 100 is opened or closed. Other examples include sensing functions, such as the sensing unit 140 sensing the presence or absence of power provided by the power supply 190, the presence or absence of a coupling or other connection between the interface unit 170 and an external device and the like. In FIG. 1, the sensing unit 140 also include a proximity sensor 141, which will be described later in relation to a touch screen.

In addition, the interface unit 170 is implemented to interface the portable terminal 100 to external devices. For instance, the interface unit 170 may include, for example, wired/wireless headset ports, external charger ports, wired/wireless data ports, a memory card port, ports for connecting a device with an identification module, audio Input/Output (I/O) ports, video I/O ports, earphone ports, and the like. The identification module may be configured as a chip for storing various information required to authenticate an authority to use the portable terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the portable terminal 100 via a port.

Further, the interface unit 170 may receive data from an external device, or be provided with power and accordingly transfer the received data or power to each component within the portable terminal 100 or transfer data of the portable terminal 100 to an external device. Also, the interface unit 170 may serve as a path for power to be supplied from an external cradle to the portable terminal 100 when the terminal 100 is connected to the external cradle or as a path for transferring various command signals input from the cradle by a user to the terminal 100. Such various command signals and power input from the cradle may operate as a signal for recognizing that the portable terminal 100 has accurately been mounted to the cradle.

In addition, the output unit 150 is configured to output an audio signal, a video signal or an alarm signal. As shown in FIG. 1, the output unit 150 includes the display 151, an audio output module 152, an alarm 153 and the like. The display 151 outputs information processed in the portable terminal 100. For example, when the portable terminal is operating in a phone call mode, the display 151 provides a User Interface (UI) or a Graphic User Interface (GUI), which includes information associated with the call. As another example, if the portable terminal is in a video call mode or a capturing mode, the display 151 may additionally or alternatively display images captured and/or received, a UI, GUI, etc. Also, as discussed above, if the display 151 is layered with a touch pad to cooperate with each other so as to configure a touch screen, the display 151 may be used as an input unit as well as an output unit. The display 151 may also be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can also be configured to be transparent such that it is possible to see the exterior therethrough. These displays are called transparent displays. A representative example of the transparent display is a Transparent Organic Light Emitting Diode (TOLED), and the like. Two or more displays 151 may also exist according to the configuration of the portable terminal 100. The touch screen may also be implemented to detect a touch pressure as well as a touch position and a touch area.

In addition, the proximity sensor 141 may be disposed in the touch screen or near the touch screen, and denotes a sensor for detecting whether there is an object approaching a certain detection surface or existing near the certain detection surface by using a force of an electromagnetic field or infrared rays, without any mechanical contact. Therefore, the proximity sensor 141 has a considerably long lifespan as compared to a contact sensor and also implements considerably high utility. Examples of the proximity sensor 141 may include a transmission type photosensor, a direct reflection type photosensor, a mirror reflection type photosensor, a high frequency oscillation type proximity sensor, a capacitive proximity sensor, a magnetic proximity sensor, an infrared proximity sensor and the like.

In addition, the high frequency oscillation type proximity sensor may be configured such that when an object to be detected approaches near a sensor detection surface in a state of an oscillation circuit oscillating a high frequency, an oscillation amplitude of the oscillation circuit is attenuated or stopped and such change is converted into an electric signal to thereby detect an existence of the object. Hence, even if a non-metallic material is intercepted between the high frequency oscillation type proximity sensor and the object to be detected, a proximity switch can detect the desired object without any interference with the material. Further, even without the proximity sensor 141 mounted, if an electrostatic touch screen is provided, the proximity of a pointer can be detected based upon the change in an electric field due to the proximity of the pointer.

Therefore, if the pointer is located near the touch screen without actually contacting the touch screen, the location of the pointer and the distance (gap) between the pointer and the touch screen can be detected. Hereinafter, when the pointer is located near the touch screen so as to be recognized as being located above the touch screen will be referred to as a "proximity touch," and when the pointer is actually contacted with the touch screen will be referred to as "contact touch." Also, the location at which the proximity touch of the pointer is recognized above the touch screen denotes a location at which the pointer is located perpendicularly to the touch screen for the proximity touch of the pointer. The use of the proximity sensor 141 allows the detection of proximity touch and proximity touch patterns (e.g., proximity touch distance, proximity touch direction, proximity touch speed, proximity touch time, proximity touch location, proximity touch movement state and the like), and also allows the output on the touch screen of information related to the detected proximity touch input and the proximity touch pattern.

In addition, the audio output module 152 may output audio data received from the wireless communication unit 110 in various modes including a call reception mode, call-placing (phone call) mode, recording mode, voice recognition mode, broadcast reception mode, and the like, or audio data stored in the memory 160. Also, the audio output module 152 may output an audio signal relating to a particular function (e.g., a tone for a call received, tone for a message received, etc.) performed in the portable terminal 100. The audio output module 152 may also be implemented using a speaker, a buzzer, or the like.

Further, the alarm 153 may output a signal to inform a generation of events associated with the portable terminal 100. Such events may include a call received, message received, user input received and the like. In addition to generating the audio or video signal, the alarm 153 may also inform the user about event generation in different manners, for example, by providing tactile sensations (e.g., vibration) to make a user identify the event generation. If a call signal or message is received, the alarm 153 may vibrate to inform the reception. Alternatively, upon a key signal being input, the alarm 153 may output a vibration as a feedback for the key signal input. The signal for informing the event generation may also be output via the display 151 or the audio output module 152.

In addition, the memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen. The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the portable terminal 100 may operate a web storage which performs the storage function of the memory 160 on the Internet.

Further, the controller 180 controls the overall operations of the portable terminal 100. For example, the controller 180 performs the control and processing associated with voice calls, data communications, video calls, and the like. In FIG. 1, the controller 180 also includes a multimedia module 181 which provides multimedia playback. The multimedia module 181 may also be configured as part of the controller 180 or as a separate component. In addition, the controller 180 can perform a pattern recognition processing so as to recognize writing or drawing input on the touch screen as text or image. Also, the power supply 190 provides power required by various components under the control of the controller 180. The provided power may be internal power, external power, or combination thereof.

In addition, various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some instances, such embodiments are implemented by the controller 180. For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Next, a communication system within which the portable terminal related to embodiments of the present invention can operate will be described. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), Universal Mobile Telecommunications System (UMTS), the Long Term Evolution (LTE) of the UMTS, the Global System for Mobile Communications (GSM), and the like. By way of a non-limiting example only, further description will relate to a CDMA communication system, but such teachings apply equally to other system types including the CDMA wireless communication system.

Figure 2:
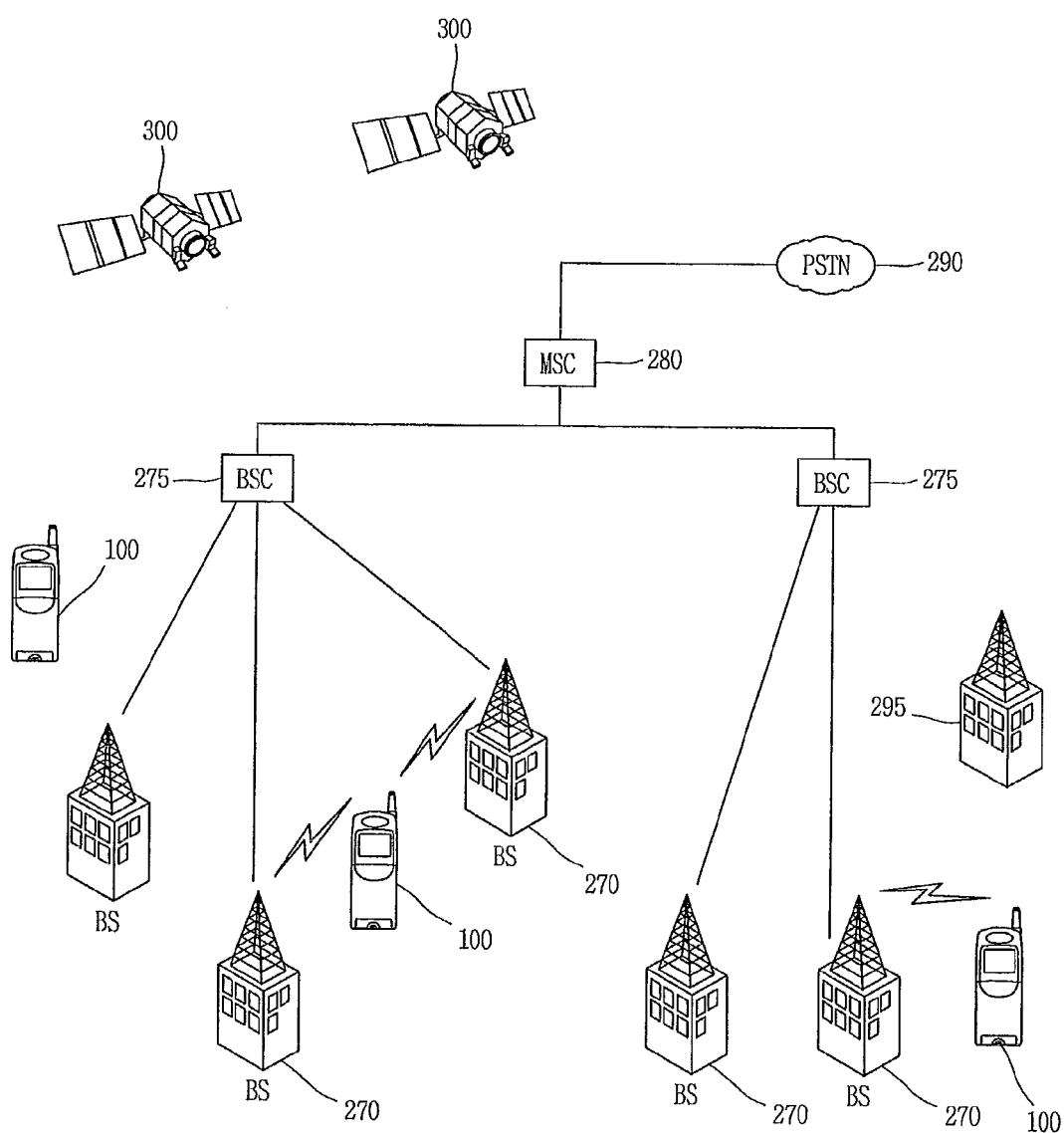
FIG. 2 is an overview of a communication system operable with a portable terminal in accordance with an embodiment of the present invention.

A CDMA wireless communication system is shown in FIG. 2 having a plurality of portable terminals 100, a plurality of base stations (BSs) 270, base station controllers (BSCs) 275, and a mobile switching center (MSC) 280. The MSC 280 is configured to interface with a Public Switch Telephone Network (PSTN) 290 and with the BSCs 275. Further, the BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Each base station 270 may include one or more sectors with each sector having an omni-directional antenna or an antenna pointed in a particular direction radially away from the base station 270. Alternatively, each sector may include two or more different antennas. Further, each base station 270 may be configured to support a plurality of frequency assignments, with each frequency assignment having a particular spectrum (e.g., 1.25 MHz, 5 MHz, etc.).

In addition, the intersection of sector and frequency assignment may be referred to as a CDMA channel. The base stations 270 may also be referred to as Base Station Transceiver Subsystems (BTSs). In some instances, the term "base station" may be used to refer collectively to a BSC 275 and one or more base stations 270. The base stations may also be denoted as "cell sites." Alternatively, individual sectors of a given base station 270 may be referred to as cell sites. Also, as shown in FIG. 2, a broadcasting transmitter (BT) 295 transmits a broadcast signal to the portable terminals 100 operating within the system. The broadcast receiving module 111 (FIG. 1) is generally configured inside the portable terminal 100 to receive broadcast signals transmitted by the BT 295.

FIG. 2 also illustrates several Global Positioning System (GPS) satellites 300. Such satellites 300 facilitate locating the position of at least one of plural portable terminals 100. Two satellites are depicted in FIG. 2, but useful position information may be obtained with greater or fewer satellites than two satellites. The GPS module 115 (FIG. 1) is configured to cooperate with the satellites 300 to obtain desired position information. Other types of position detection technology, (i.e., location technology that may be used in addition to or instead of GPS location technology) may alternatively be implemented. At least one of the GPS satellites 300 may alternatively or additionally be configured to provide satellite DMB transmissions.

During operation of the wireless communication system, the base stations 270 receive sets of reverse-link signals from various portable terminals 100. The portable terminals 100 are engaging in calls, messaging, and executing other communications. Each reverse-link signal received by a given base station 270 is processed within that base station 270, and the resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the portable terminals 100.

Figure 3:
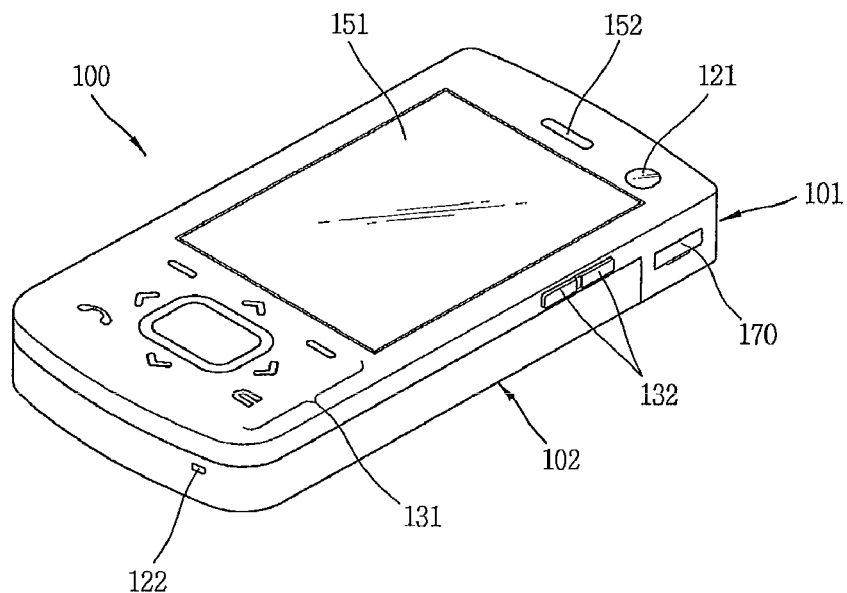
FIG. 3 is a front perspective view showing a closed position of a portable terminal in accordance with an embodiment of the present invention.
Figure 4:
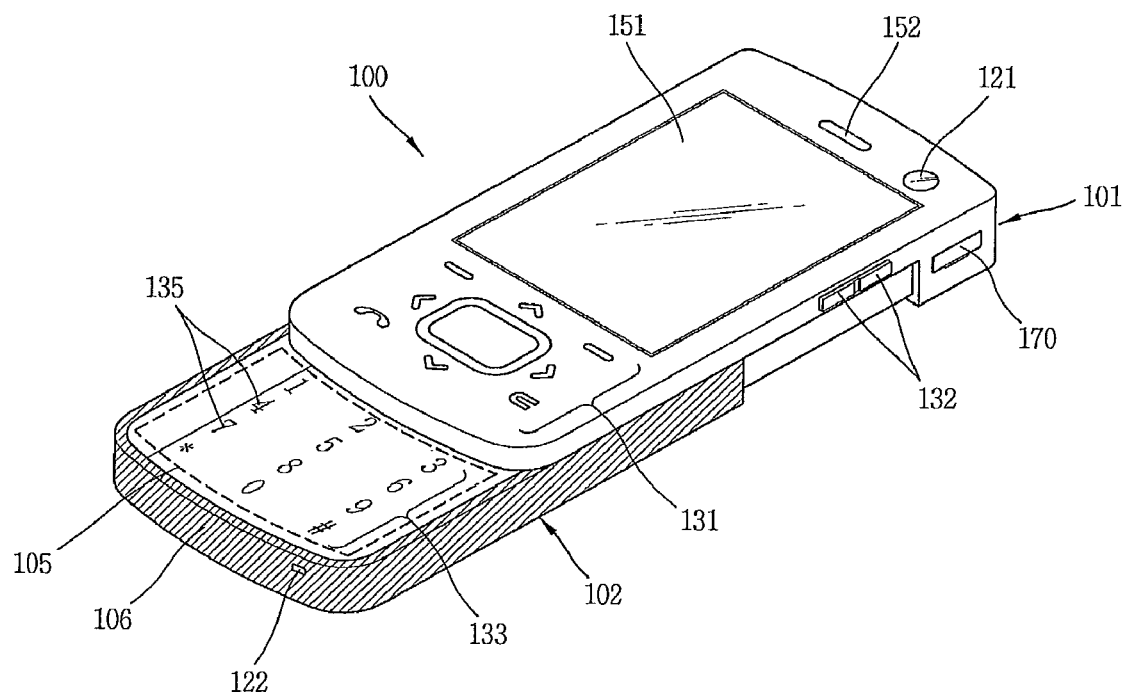
FIG. 4 is a front perspective view showing an open position of the portable terminal shown in FIG. 3.

Next, various types and structures of portable terminals according to embodiments of the present invention will be described. In more detail, FIG. 3 is a front perspective view showing a closed position of the portable terminal 100 in accordance with an embodiment of the present invention, and FIG. 4 is a front perspective view showing an open position of the portable terminal 100 shown in FIG. 3. As shown in FIGS. 3 and 4, the portable terminal 100 includes a front body 101 and a rear body 102 slidably coupled to each other. In addition, a part of the rear body 102 can be forwardly exposed as shown in FIG. 4, and this state may be referred to as an opened configuration (or opened position). Also, the part of the rear body being exposed can be obscured by the front body 101 as shown in FIG. 3, and this state may be referred to as a closed configuration (or closed position).

Figure 6:
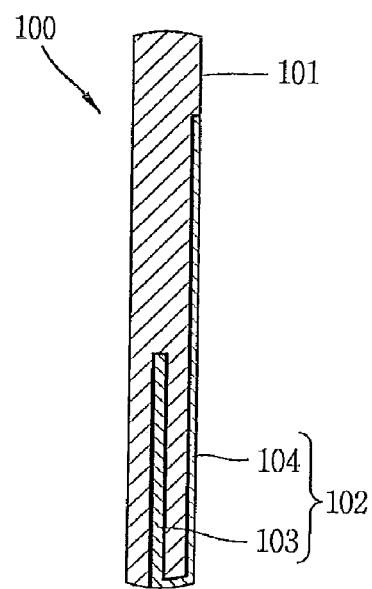
FIG. 6 is a cross-sectional view showing a schematic construction of a portable terminal in accordance with an embodiment of the present invention.
Figure 7:
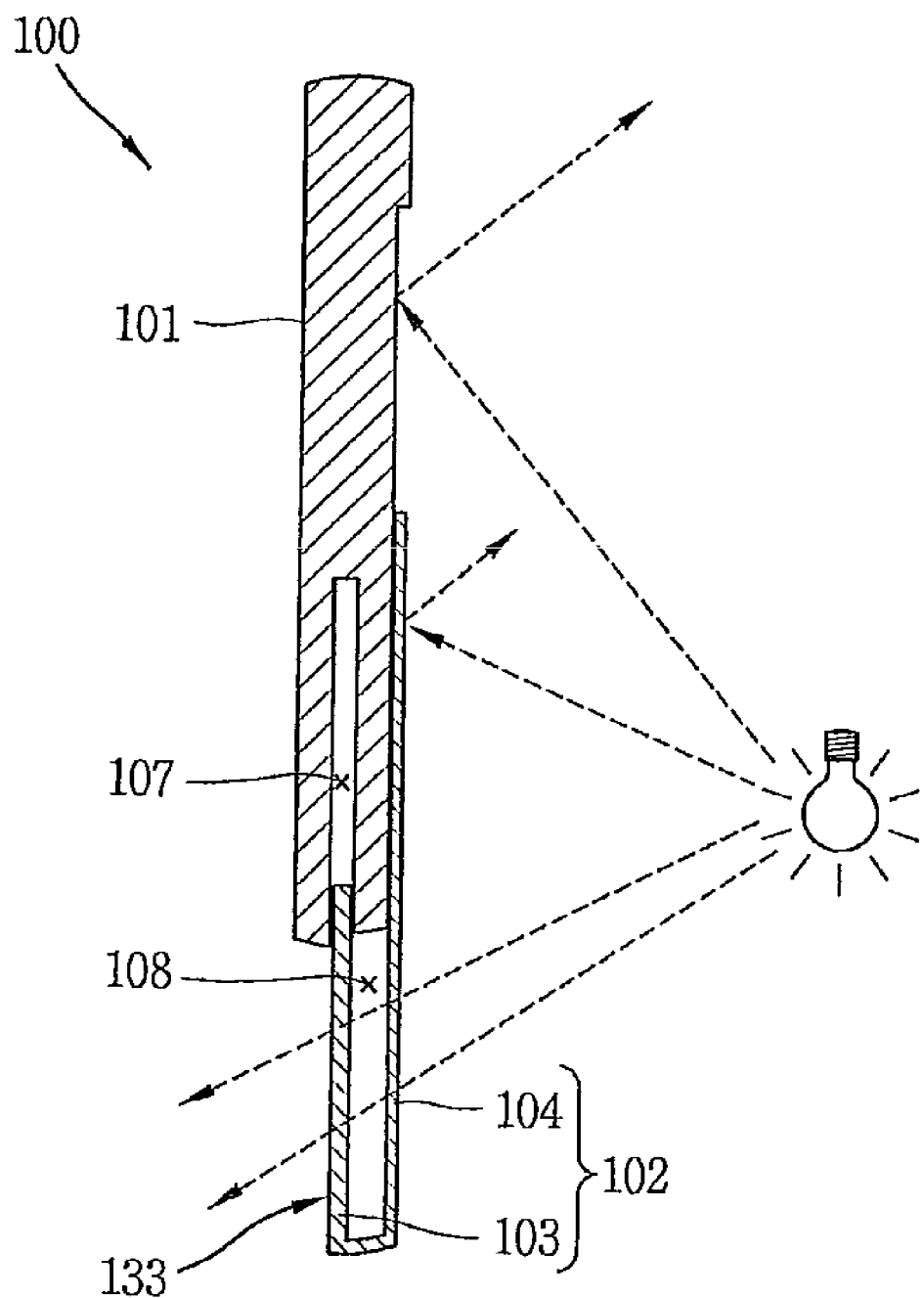
FIG. 7 is a cross-sectional view showing an open position of the portable terminal shown in FIG. 6.

Further, the front body 101 and the rear body 102 are formed in a bar type so as to overlap with each other. Also, as can be seen in FIGS. 6 or 7 to be explained later, the rear body 102 and the front body 101 may have a section in a shape of '⊂' so as to face each other. Accordingly, a form factor may be configured to minimize the generation of a stepped portion between the front surface of the front body 101 and the front surface of the rear body 102 or between the rear surface of the front body 101 and the rear surface of the rear body 102 in the opened configuration and the closed configuration. In addition, the portable terminal 100 generally operates in a standby (idle) mode in the closed position, but the standby mode may be released by a user's manipulation. Also, the portable terminal 100 operates in a phone call mode, editing mode and the like in the opened position, but such modes can be converted into the standby mode by the user's manipulation or after a preset time elapses.

In addition, functions or components disposable at the front body 101 and the rear body 102 can be implemented in various configurations depending on which function or user interface the portable terminal 100 is intended to implement. FIGS. 3 and 4 show an example that the display 151, the audio output module 152, a first manipulation portion 131 and the first video input unit (camera) 121 are disposed at the front body 101. Also, a case (casing, housing, cover and the like) configuring an outer appearance of the front body 101 may be formed in plurality in number. A space formed inside the case also accommodate various electric components. Further, the case is formed to be transparent such that light-emitting elements or other visual components disposed inside the case can be seen therethrough.

In addition, the first manipulation portion 131 is always exposed to the outside regardless of the portable terminal 100 being in the opened configuration or the closed configuration. In such a state, upon operating the first manipulation portion 131, the display 151 is activated or the portable terminal 100 operates in a particular mode. The first manipulation portion 131 may include a touch sensitive unit for allowing a touch input in a touch manner, and may also include an illuminating (light-emitting) member for implementing various illuminating (lighting) effects responsive to a user input.

Also, the display 151 denotes a device for visually displaying information. As discussed above, examples of the display 151 include a liquid crystal display (LCD), an organic light emitting diode (OLED), an e-paper, a transparent OLED (TOLED) and the like. The display 151 may further include a touch sensitive portion so as to allow information to be input by a user's touch. In this instance, the display 151 may be sized to correspond to the front surface of the front body 101. Further, in the closed position of the front body 101, input and output operations can be performed via the display 151. As an example, the display 151 may be configured to output or display a type of keypad so as to allow inputting of numbers or letters or executing of functions indicated with icons, and thus a user can input information by touching the keypad.

In addition, the audio output module 152 serves to output call related sounds and can act as a loud speaker for outputting various alarm sounds of systems or multimedia reproduction sounds. Alternatively, the audio output module 152 may separately include a speaker. In addition, the first video input unit 121 may be configured in a type of a camera module for capturing a user's image or video during self-photographing (self-portrait mode) or video (telephony) call. Also, as shown in FIGS. 3 and 4, a second manipulation portion 132 and the interface unit 170 are disposed at a side surface of the front body 101 or the rear body 102. Also, the second manipulation portion 132 may operate as a hot-key which performs a specific function, such as activation of the video input unit 121 and video input unit 123 shown in FIG. 5. The second manipulation portion 132 may also be adopted to be manipulated by a user in a tactile manner.

Further, the interface unit 170 serves to interface the portable terminal 100 in accordance with an embodiment of the present invention with external devices for data exchange therebetween. For example, examples of the interface unit 170 include at least one of a connection terminal to be connected to an earphone by a wire or wirelessly or a power supply terminals for supplying power to ports for short-range communications (e.g., an Infrared Data Association (IrDA) port, a BLUETOOTH port, a wireless LAN port and so on). Alternatively, the interface unit 170 may be configured as a card socket for accommodating a Subscriber Identification Module (SIM) card, a User Identity Module (UIM) card, or an external card such as a memory card for storing information.

As shown in FIG. 4, in the opened position of the portable terminal 100, an exposed portion of the rear body 102 includes a visually transparent region 105 and a non-transparent (opaque) region 106. A transparent input module 133 for allowing inputting of information or the like is also disposed at the transparent region 105. In FIG. 4, the transparent input module 133 includes a plurality of numerals, letters (characters) or marks (symbols) 135 (hereinafter, referred to as 'numerals 135 or the like'). The numerals 135 or the like may also be identified by light emitted (illuminated).

Figure 5:
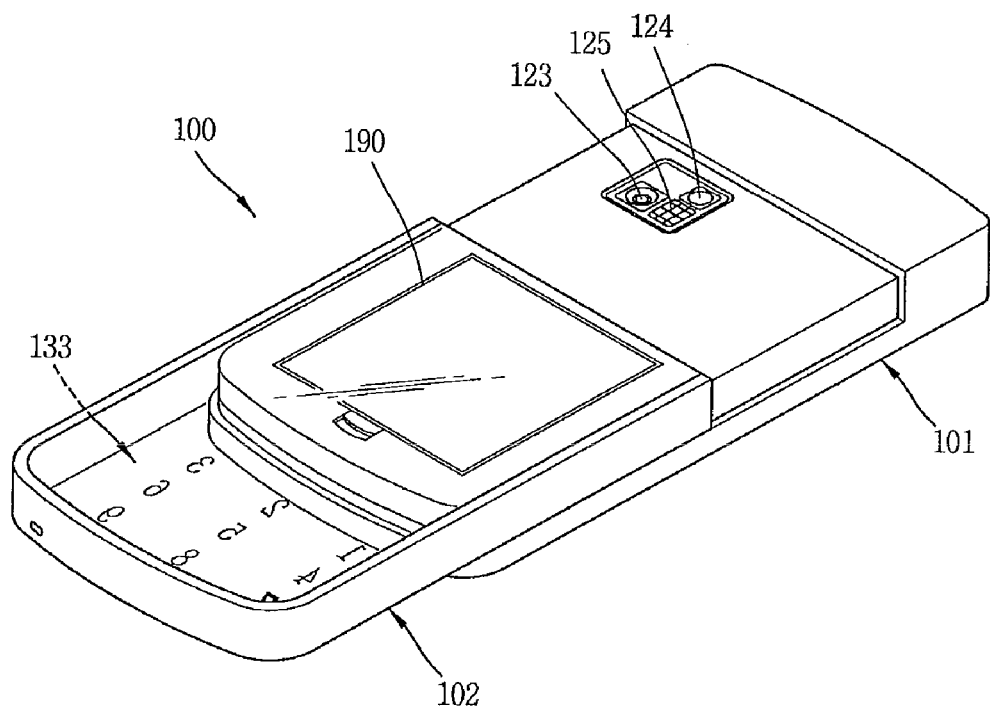
FIG. 5 is a rear perspective view showing an open position of the portable terminal shown in FIG. 3.

Next, FIG. 5 is a rear perspective view showing an opened position of the portable terminal shown in FIG. 3. As shown in FIG. 5, the second video input unit 123 and the battery (i.e., power supply) 190 are disposed at the rear surface of the front body 101. The second video input unit 123 and the battery 190 are obscured in the closed position by a cover portion 104 (see FIG. 6) configuring the rear body 102, and the second video input unit 123 is exposed in the opened position. The second video input unit 123 may be a camera which faces a direction which is substantially opposite to a direction faced by the first video input unit 121 and has a different amount of pixels from those of the first video input unit 121. For example, the first video input unit 121 may operate with relatively lower pixels (lower resolution). Thus, the first video input unit 121 may be useful when a user can capture his face and send it to another party during a video call or the like. On the other hand, the second video input unit 123 may operate with a relatively higher pixels (higher resolution) such that it can be useful for a user to obtain higher quality pictures for later use.

As shown in FIG. 5, a flash 125 and a mirror 124 are additionally disposed adjacent to the second video input unit 123. Further, the flash 125 operates in conjunction with the second video input unit 123 when taking a picture using the second video input unit 123. The mirror 124 can cooperate with the second video input unit 123 to allow a user to photograph himself in a self-portrait mode. Also, FIG. 5 illustrates that the second video input unit 123 and the like are disposed at the front body 101, but the arrangement is not limited to this. For example, at least one or more components described as being disposed at the front body 101, such as the second video input unit 123 and the like, may be mounted at the rear body 102.

In addition, the battery 190 may be configured to be rechargeable and detachably disposed at the front body 101. Further, the cover portion 104 configuring the rear body 102 can be opened so as to allow attaching or detaching of the battery 190. The battery 190 may be formed in a structure of a battery cell being integrally formed with a packing member having a shape corresponding to the rear surface of the front body 101. Accordingly, when the battery 190 is viewed from the outside through the transparently configured cover portion 104, the aesthetic effect of the portable terminal 100 is not significantly affected.

Next, FIG. 6 is a cross-sectional view showing a schematic construction of a portable terminal in accordance with an embodiment of the present invention, and FIG. 7 is a cross-sectional view showing an open position of the portable terminal shown in FIG. 6. As shown in FIGS. 6 and 7, the front body 101 and the rear body 102 are configured to be opened (opened configuration) and closed (closed configuration) with respect to each other. Further, the rear body 102 includes a sliding portion 103 configured to be slidable with respect to the front body 101 so as to be inserted into the front body 101 or extended from (pulled out of) the front body 101, and the cover portion 104 coupled to the sliding portion 103 and configured to be slidable along the rear surface of the front body 101.

Also, the front body 101 is provided with slide holes 107 formed in a lengthwise direction of the front body 101 such that the sliding portion 103 can be retracted therein. Accordingly, in the closed position, the sliding portion 103 is not exposed and is retracted in the slide holes 107. Such configuration and arrangement of the front body 101 minimizes the increase in a difference between a thickness of the front body 101 and an overall thickness of the portable terminal 100, and also reduces a generation of any step between the front body 101 and the rear body 102 in the opened position. An elastic module may also be disposed between the front body 101 and the rear body 102 so as to apply an elastic force while the front body 101 is slid with respect to the rear body 102. In more detail, the elastic module may be disposed between the front body 101 and the sliding portion 103 of the rear body 102, or between the front body 101 and the cover portion 104 of the second body 102.

Further, the rear body 102 is provided with a receiving hole 108 in which the battery 190 of the front body 101 is accommodated in the closed position. When the portable terminal 100 is in the opened position, the receiving hole 108 is in an empty state as the battery of the front body 101 moves together with the front body 101. Accordingly, an object located at a rear side may be viewable through the transparent input portion 133 or the cover portion 104. Here, the term 'transparent' includes the meanings of 'completely-transparent' or 'semi-transparent'.

Figure 8:
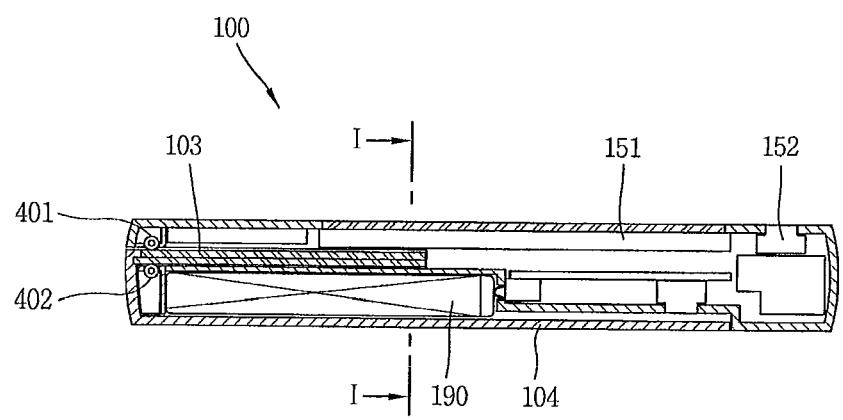
FIG. 8 is a cross-sectional view showing in detail a closed position of a portable terminal in accordance with an embodiment of the present invention.
Figure 9:
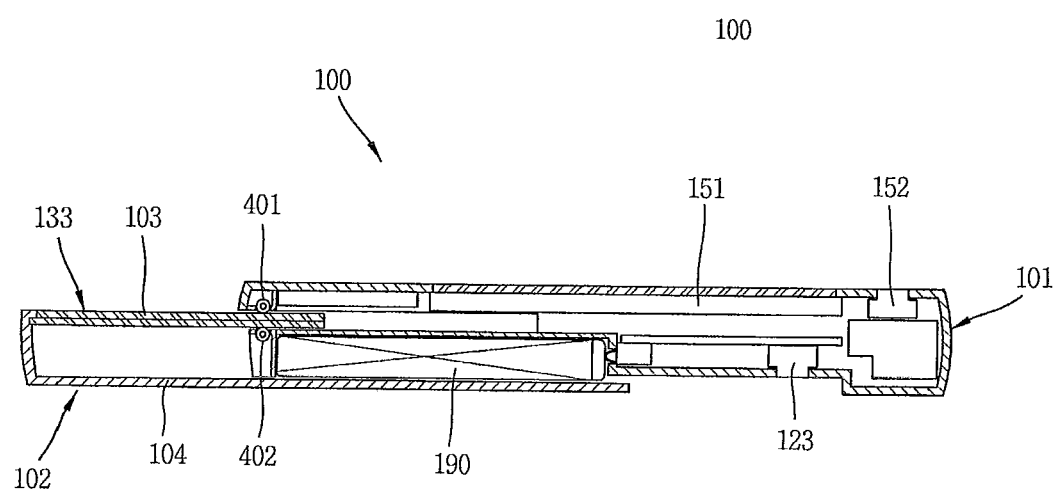
FIG. 9 is a cross-sectional view showing an open position of the portable terminal shown in FIG. 8.
Figure 10:
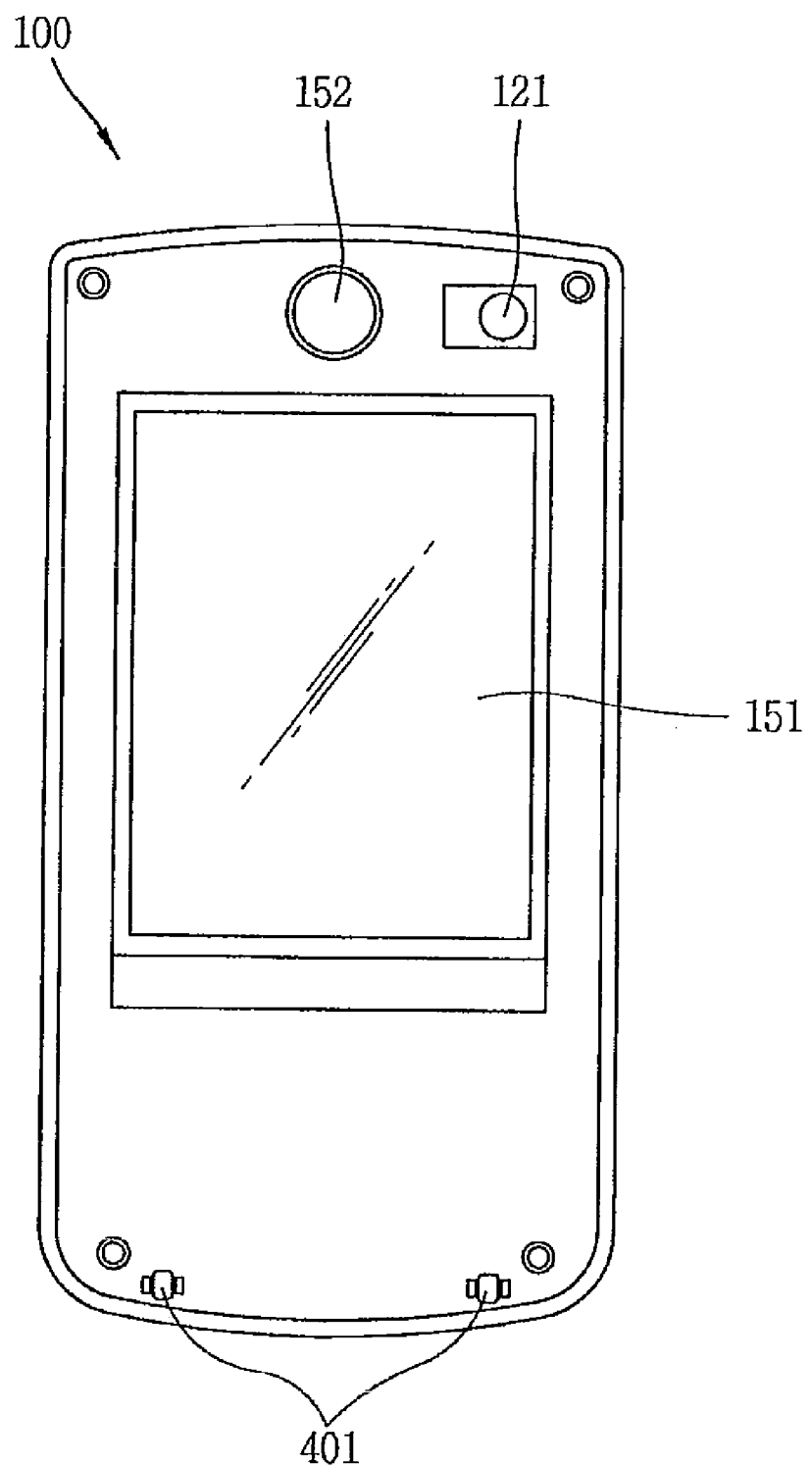
FIG. 10 is a front view of the portable terminal shown in FIG. 8.
Figure 11:
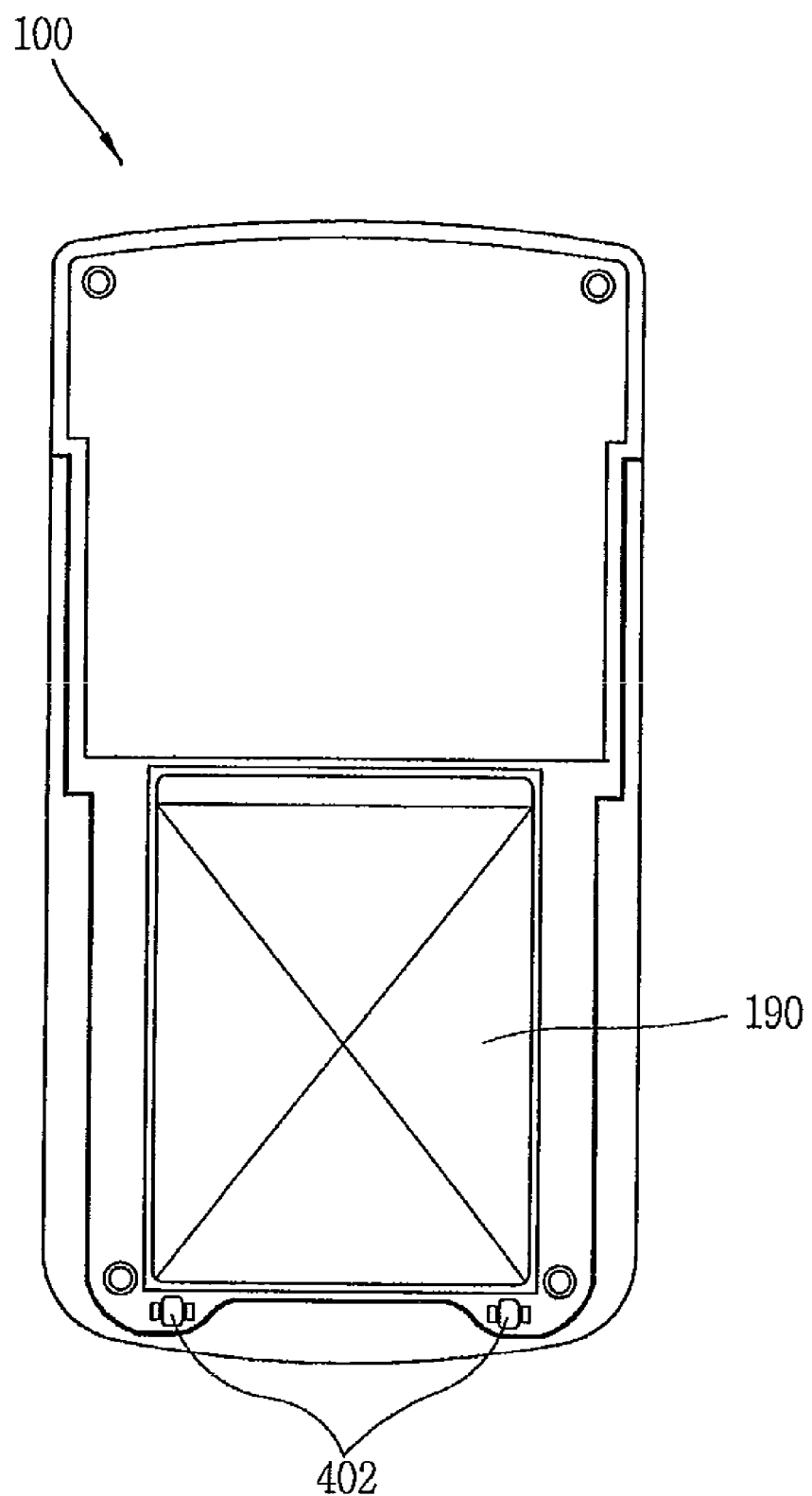
FIG. 11 is a rear view of the portable terminal shown in FIG. 8.

Next, FIG. 8 is a cross-sectional view showing in detail a closed position of a portable terminal in accordance with an embodiment of the present invention, FIG. 9 is a cross-sectional view showing an open position of the portable terminal shown in FIG. 8, FIG. 10 is a front view of the portable terminal shown in FIG. 8, and FIG. 11 is a rear view of the portable terminal shown in FIG. 8. In order to minimize a problem that the rear body 102 is shaken (vibrated) with respect to the front body 101 when the rear body 102 is moved, rollers 401 and 402 are mounted between the sliding portion 103 and the front body 101. The rollers 401 and 402 include a front surface roller 401 disposed at the front surface of the sliding portion 103 and a rear surface roller 402 disposed at the rear surface of the sliding portion 103. The front surface roller 401 and the rear surface roller 402 may be disposed as a pair at each of right and left sides with a preset distance therebetween (see FIGS. 10 and 11) so as to prevent the sliding portion 103 from being inclined to any one side. Alternatively, any one of the front surface rollers 401 and the rear surface rollers 402 may be used.

Figure 12:
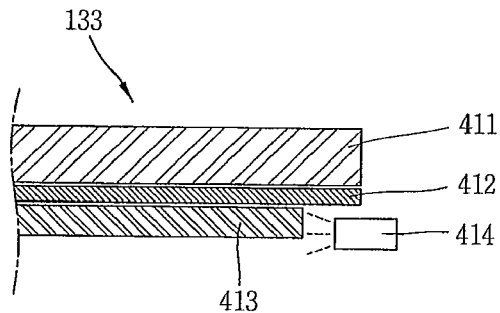
FIG. 12 is a cross-sectional view of a transparent input module in accordance with an embodiment of the present invention.

Next, FIG. 12 is a cross-sectional view of the transparent input module 133 in accordance with an embodiment of the present invention. As shown in FIG. 12, the transparent input module 133 includes a transparent protective layer 411, and a transparent touch sensitive layer 412 disposed inside of the transparent protective layer 411. The transparent touch sensitive layer 411 may be formed of a transparent resin such as poly carbonate (PC), and may have thickness and intensity thick and strong enough to minimize a deformation caused by a touch. Further, the touch sensitive layer 412 may be configured by patterning a transparent conductive material, such as indium tin oxide (ITO), on a transparent film. The touch sensitive layer 412 may be implemented in a manner of generating an electric signal by detecting (sensing) a change in a capacitance, an approach (proximity) of an object, or a change in a pressure applied onto the protective layer 411.

In addition, a transparent reinforced glass layer 413 configured to support the transparent protective layer 411 and the touch sensitive layer 412 is disposed inside of the touch sensitive layer 412. The reinforced glass layer 412 may be fabricated to be thin enough and also to have a rigidity so as to reduce a distortion caused by a deformation of the transparent protective layer 411. Also, the reinforced glass layer 413 may be provided with the numerals 135 or the like defining keys as shown in FIG. 4. The numerals 135 or the like may be formed by carving them on the surface of the reinforced glass layer 413. Further, the numerals 135 or the like may be contents output on a transparent display, e.g., LCD, TOLED, e-paper and the like.

An illuminating member 414 for facilitating an identification of the numerals 135 or the like is also disposed at one side of the reinforced glass layer 413. The illuminating member 414 may be configured as a light source such as a light emitting diode (LED). Thus, light illuminated (emitted) from the illuminating member 414 is moved by a reflection inside the reinforced glass layer 413 until the light reaches numerals 135 or the like. Then, such numerals 135 or the like become brighter than other portions due to a scattered reflection or the like of the light, so as to be easily identified.

Figure 13:
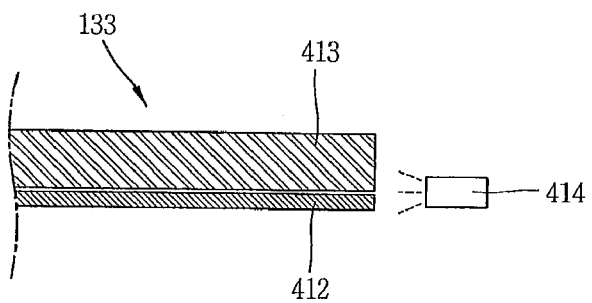
FIGS. 13 to 15 are cross-sectional views respectively showing a transparent input module in accordance with an embodiment of the present invention.
Figure 14:
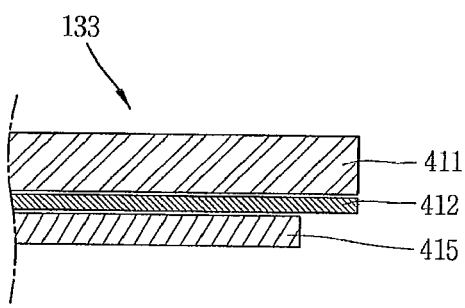
Figure 15:
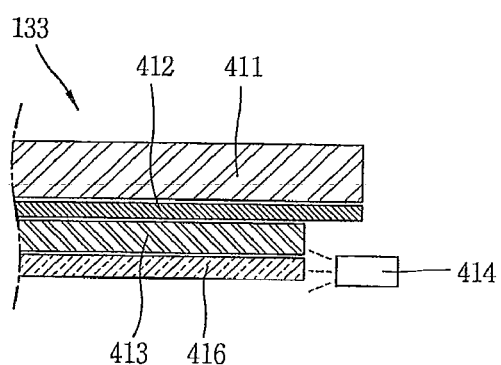

FIGS. 13 to 15 are cross-sectional views respectively showing other examples of the transparent input module 133 in accordance with an embodiment of the present invention. As shown in FIG. 13, the transparent input module 133 includes the transparent reinforced glass layer 413 and a touch sensitive layer 412 disposed inside of the reinforced glass layer 413. That is, unlike the embodiment of FIG. 12, the reinforced glass layer 413 is disposed to be directly exposed to the outside so as to protect the surface of the transparent input module 133 and also firmly support it against an external force. Numerals, letters or marks may be carved on the reinforced glass layer 413 and such numerals, letters or marks may be easily identified by light coming from the illuminating member 414 disposed at one side of the reinforced glass layer 413.

As shown in FIG. 14, the transparent input module 133 includes the transparent protective layer 411, the touch sensitive layer 412 and an illuminating layer 415. In particular, unlike the embodiment of FIG. 12 which employs a light source, the illuminating layer 415 illuminates (emits) light onto the transparent input module 133 by using a type of surface-emission. In this instance, numerals, letters or marks may be disposed on the illuminating layer 415, and the illuminating member 415 may be configured by using a surface-emitting element, such as an organic light emitting diode (OLED).

As shown in FIG. 15, the transparent input module 133 includes the transparent protective layer 411, the touch sensitive layer 412, the transparent reinforced glass layer 413 and a light guiding sheet 416. Here, the light guiding sheet 416 is configured to guide light, which is emitted from the illuminating member 414 disposed at one side of the light guiding sheet 416 and then comes to a side surface of the light guiding sheet 416, so as to allow an even emission of light. Further, the configurations of the transparent input module 133 illustrated in FIGS. 12 to 15 may also be applicable to the first manipulation portion 131 of FIG. 1. That is, as one example, the first manipulation portion 131 includes the transparent protective layer 411, the transparent touch sensitive layer 412 disposed inside of the transparent protective layer 411 and configured to detect a touch input applied onto the transparent protective layer 411, and the transparent reinforced glass layer 413 disposed inside of the transparent touch sensitive layer 412 and configured to support the transparent protective layer 411 and the touch sensitive layer 412.

Figure 16:
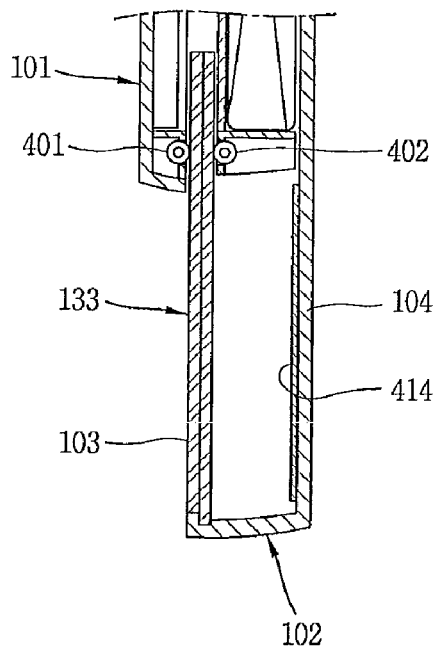
FIGS. 16 and 17 are cross-sectional views respectively showing a rear body in accordance with an embodiment of the present invention.
Figure 17:
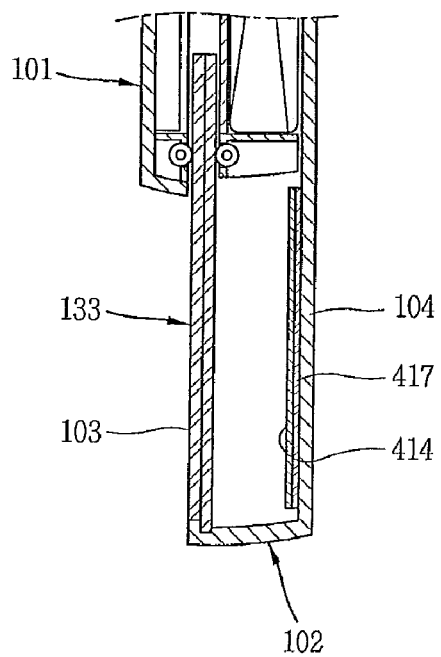

Next, FIGS. 16 and 17 are cross-sectional views showing different examples of the rear body 102 in accordance with an embodiment of the present invention. As shown in FIG. 16, the illuminating member 414 for illuminating the transparent input module 133 is disposed on an inner side surface of the cover portion 104 configuring the rear body 102. That is, unlike the embodiments in FIGS. 12 to 15, the illuminating portion 414 is disposed on the inner side surface of the cover portion 104 so as to minimize the increase in the thickness of the transparent illuminating member 414 and also obtain more various lighting effects. In this instance, letters, numerals or marks indicating keys may be arranged on the illuminating member 414. Also, in the closed position of the portable terminal 100, the illuminating member 414 may provide a lighting effect to the rear surface of the portable terminal 100.

FIG. 17 illustrates a display 417 for allowing an image output thereon is disposed between the illuminating member 414 and the cover portion 104. That is, by further employing a display such as OLED or LCD, a user can input data or the like via the transparent input module 133 in various modes and also a lighting effect can be implemented at the transparent input module 133.

Figure 18:
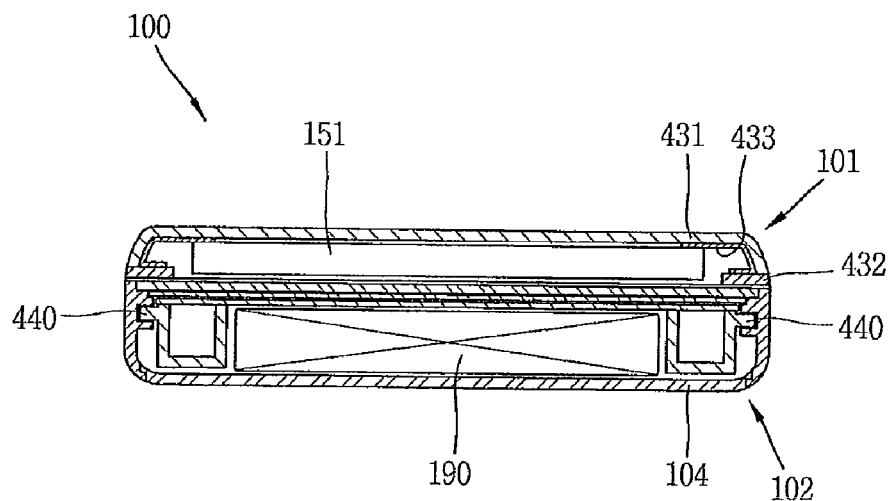
FIG. 18 is a cross-sectional view taken along the line I-I of FIG. 9.

Next, FIG. 18 is a cross-sectional view taken along the line I-I of FIG. 9. As shown in FIG. 18, the front body 101 includes a front case 431 serving as a window of the display 151, and a rear case 432 coupled to the front case 431. The front case 431 is configured to be transparent, and can be formed by using a resin, such as poly carbonate, or a reinforced glass. In order to enhance an assembly of the front case 431, a metallic board 433, such as stainless steel (STS), may be coupled to the front case 431 through an insertion process. In this instance, the metallic board 433 may be viewable from the outside through the transparent front case 431. Thus, the surface of the metallic board 433 may be micro-patterned to add a decorative effect thereon. Slide rails 440 for ensuring a linear movement upon the sliding portion 103 being slid are further installed between the sliding portion 103 configuring the rear body 102 and both side surfaces of the front body 101. Either the slide rails 440 or the rollers 401 and 402 described above maybe selectively used or all of them may be used.

Figure 19:
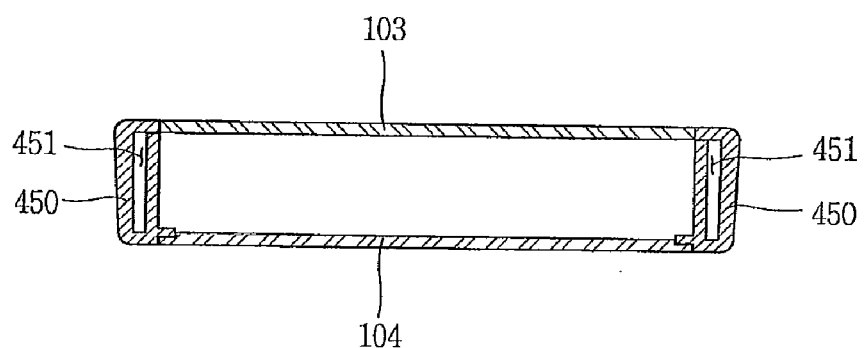
FIG. 19 is a cross-sectional view showing an assembled state between a sliding portion and a cover portion in accordance with an embodiment of the present invention.

FIG. 19 is a cross-sectional view showing an assembled structure between the sliding portion 103 and the cover portion 104 in accordance with an embodiment of the present invention. If the sliding portion 103 and the cover portion 104 are configured to be transparent, an opaque covering member 450 may further be provided in the rear body 102 so as to obscure a data line, which may be formed at an edge of the transparent input module 133 or shield the assembled state between the sliding portion 103 and the cover portion 104. The opaque covering member 450 may integrally be formed with one of the sliding portion 103 or the cover portion 104, and provided with a through hole 451 for receiving components therein. The illuminating member 414 may be disposed in the opaque covering member 450.

Figure 20:
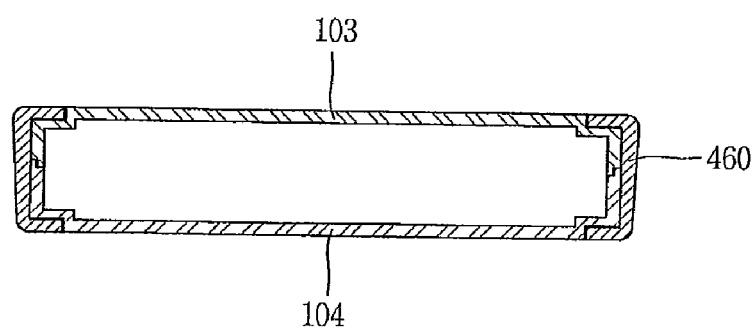
FIG. 20 is a cross-sectional view showing another assembled state between a sliding portion and a cover portion in accordance with an embodiment of the present invention.

Further, FIG. 20 is a cross-sectional view showing another assembled structure between the sliding portion 103 and the cover portion in accordance with an embodiment of the present invention. As shown in FIG. 20, the sliding portion 103 is directly coupled to the cover portion 104. In addition, an opaque covering member 460 may have a section in a shape of '[' or ']' so as to cover the edges of the rear body 102.

Figure 21:
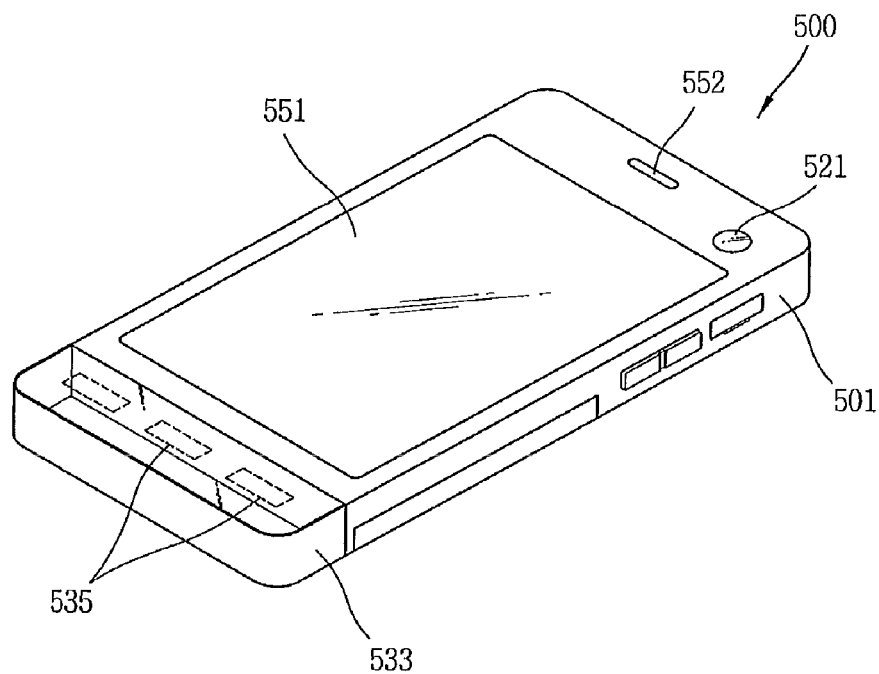
FIG. 21 is a perspective view showing a second type of portable terminal with a transparent input module in accordance with an embodiment of the present invention.

Next, FIG. 21 is a perspective view showing a portable terminal 500 with a transparent input module 533 in accordance with another embodiment of the present invention. As shown in FIG. 21, the portable terminal 500 includes a 'bar' type terminal body 501 provided at a front surface thereof, a display 551, an audio input unit 552, a video input unit 521 and the like. The transparent input module 533 formed to be transparent or semitransparent is also disposed at a lower end of the terminal body 501 in a depthwise direction. The transparent input module 533 may be configured to include the same configurations as shown in FIGS. 4 to 15, and thus a detailed description of this module is omitted.

In addition, the transparent input module 533 may include keys 535 indicating several specific functions or directions so as to reduce the size, if possible, by considering a reduction of an installation space for other opaque components disposed inside thereof. The transparent input module 533 may be provided with an illuminating member so as to emit light toward keys 535, and further include a transparent display.

Figure 22A:
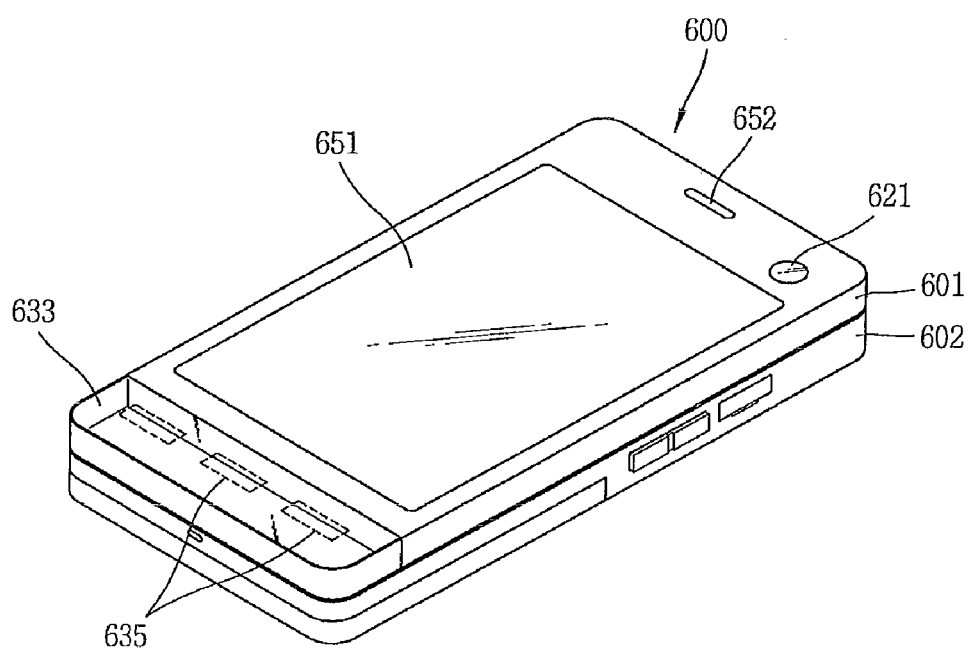
FIGS. 22A to 22C are perspective views showing a third type of portable terminal with a transparent input module in accordance with an embodiment of the present invention.
Figure 22B:
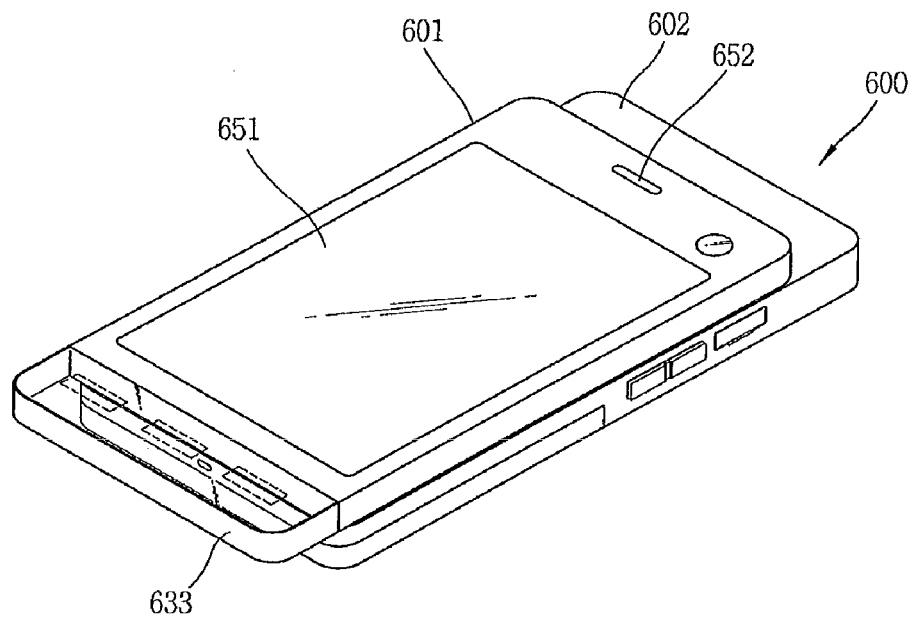
Figure 22C:
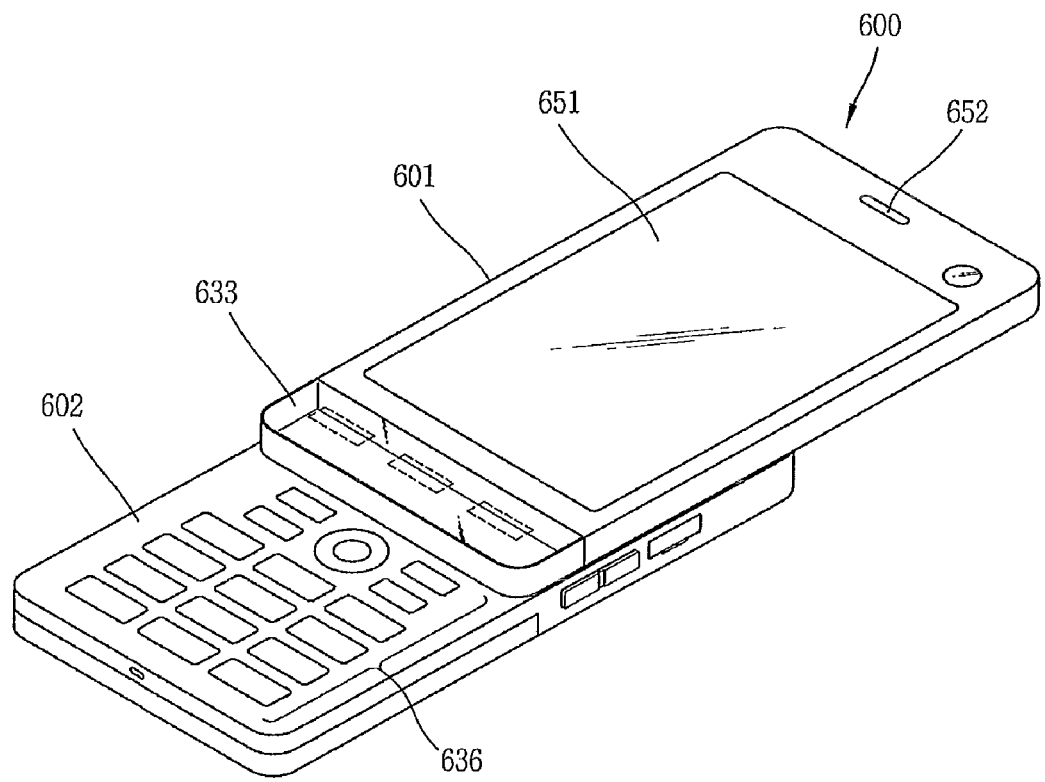

Next, FIGS. 22A to 22C are perspective views showing a portable terminal 600 with a transparent input module 633 in accordance with yet another embodiment of the present invention. As shown in FIGS. 22A to 22C, the portable terminal 600 includes a first terminal body 601 provided at its front surface with a display 651, an audio input unit 652, a video input unit 621 and the like, and a second terminal body 602 slidably coupled to the first terminal body 601. The transparent input module 633 configured to be transparent or semitransparent is also formed at a lower end of the first terminal body 601. The transparent input module 633 may include the configurations as aforementioned in FIGS. 4 to 15.

In a state of the first terminal body 601 being totally overlapped on the second terminal body 602 as shown in FIG. 22A and if the first terminal body 601 is slightly slid down as shown in FIG. 22B, the transparent input module 633 overlapped on the second terminal body 602 is exposed. Also, the first terminal body 601 may be configured to stop sliding at a location as shown in FIG. 22B. In this state, a user can input what he or she wants through the transparent input module 633 and also view an object located at the rear side through the transparent input module 633. Additionally, an aesthetic effect is enhanced. In addition, if the first terminal body 601 is slid up to a certain distance as shown in FIG. 22C, a keypad 636 disposed on the second terminal body 602 for allowing inputting of numerals or letters is exposed. In this instance, the transparent input module 633 may be set to be used for indicating a general input or function.

Figure 23A:
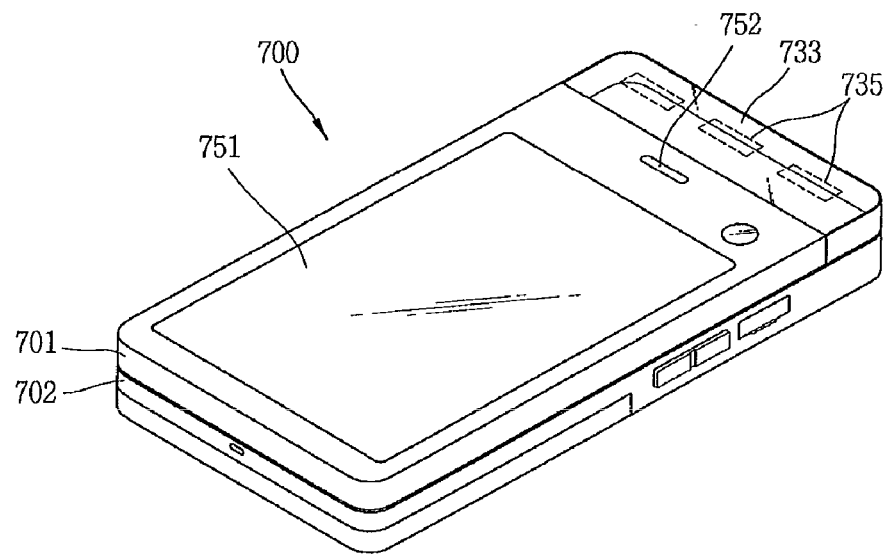
FIGS. 23A to 23C are perspective views showing a fourth type of portable terminal with a transparent input module in accordance with an embodiment of the present invention.
Figure 23B:
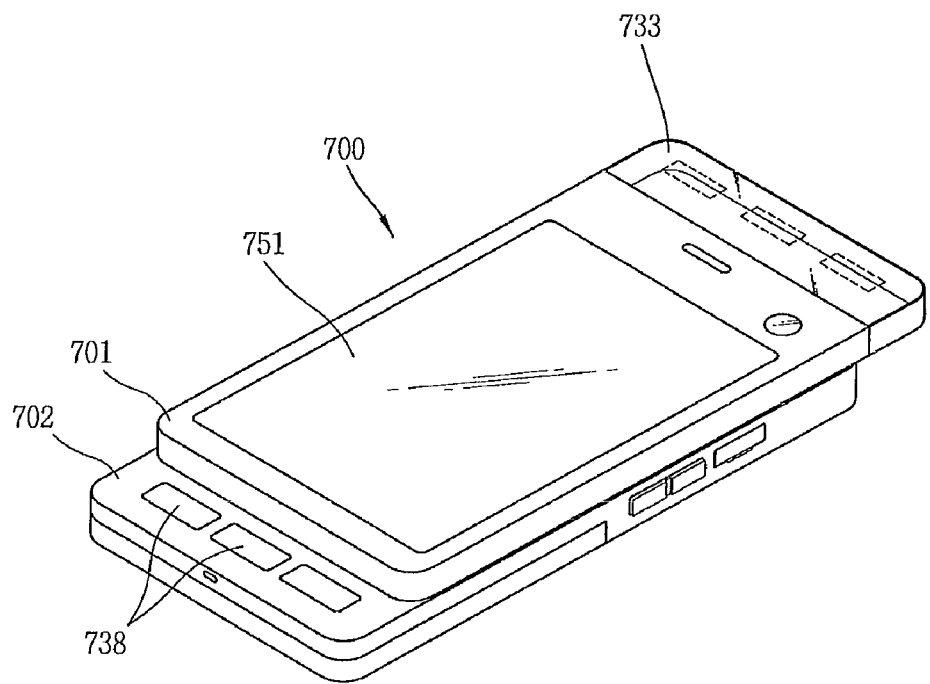
Figure 23C:
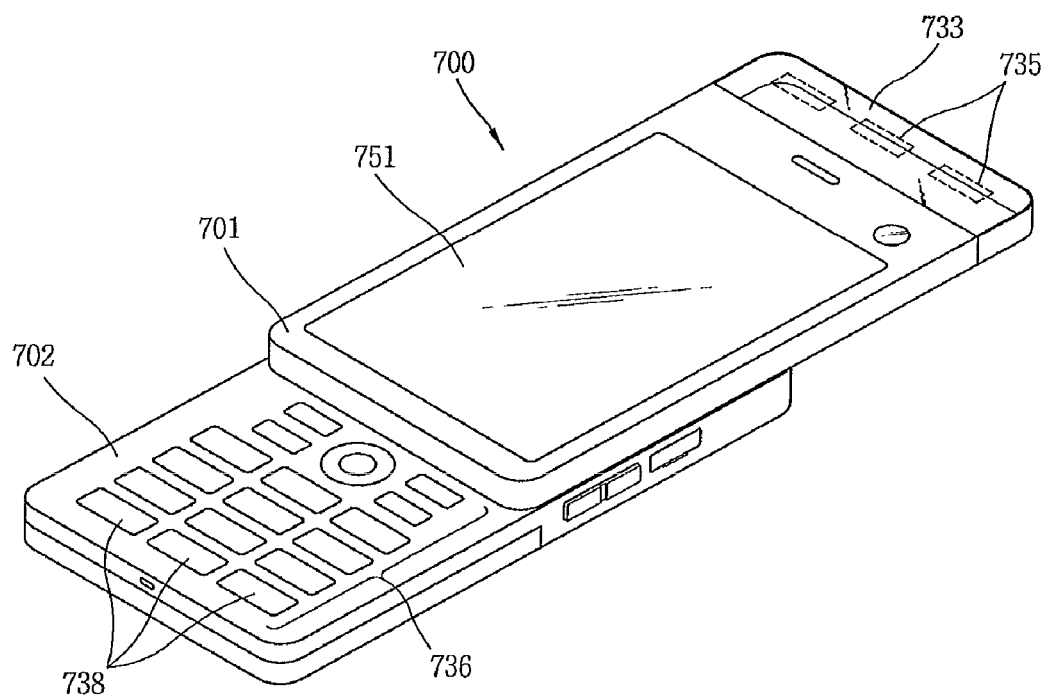

FIGS. 23A to 23C are perspective views showing a portable terminal 700 with a transparent input module 733 in accordance with another embodiment of the present invention. As shown in FIGS. 23A to 23C, the portable terminal 700 includes a first terminal body 701 provided at its front surface with a display 751, an audio input unit 752, a video input unit 721 and the like, and a second terminal body 702 slidably coupled to the first terminal body 701. The transparent input module 733 configured to be transparent or semitransparent is also formed at an upper end of the first terminal body 701. The transparent input module 733 may include the configurations as aforementioned in FIGS. 4 to 15.

In a state of the first terminal body 701 is totally overlapped on the second terminal body 702 as shown in FIG. 23A, and if the first terminal body 701 is slightly slid up as shown in FIG. 23B, the transparent input module 733 overlapped on the second terminal body 702 is exposed from the second terminal body 702. In addition, several keys 738 are also exposed at the lower end of the second terminal body 702. Such keys 738 may be used as keys for indicating functions or directions (e.g., directional keys) together with the transparent input module 733, or be used as dedicated keys for instructing a function, e.g., relating to image capturing or music file reproducing. Further, if the first terminal body 701 is further slid up to a certain distance as shown in FIG. 23C, a keypad 736 including the keys 738 and being disposed on the second terminal body 702 for allowing inputting of numerals or letters is exposed. In this instance, the transparent input module 733 may be set to be used for indicating a general input or function. In this instance, a user can input what he or she wants through the transparent input module 733 and also view an object located at the rear side through the transparent input module 733. Additionally, an aesthetic effect is enhanced. The transparent module 733 can also have keys 735.

Figure 24A:
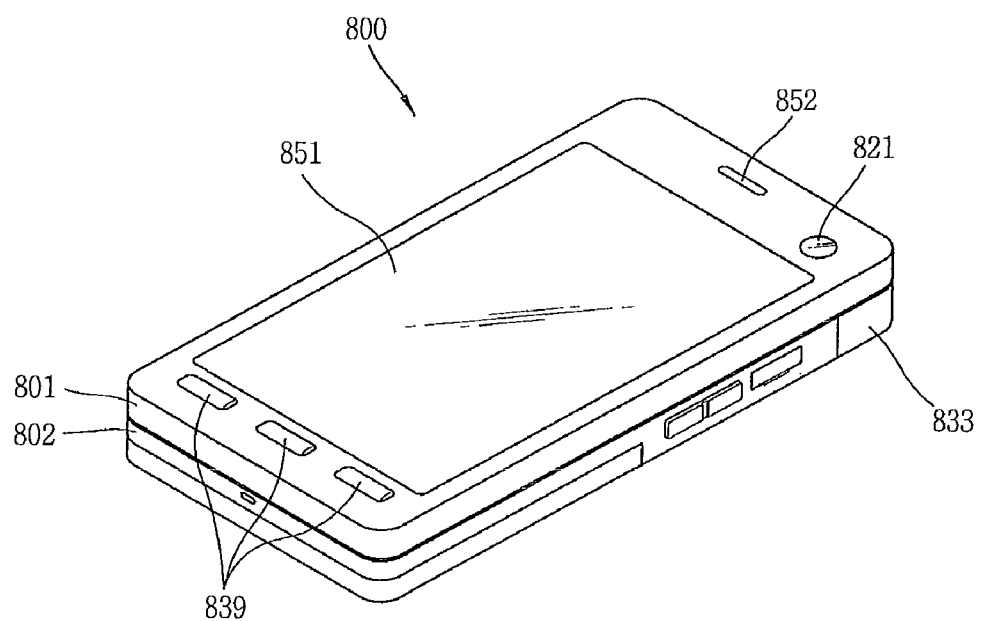
FIGS. 24A to 24C are perspective views showing a fifth type of portable terminal with a transparent input module in accordance with an embodiment of the present invention.
Figure 24B:
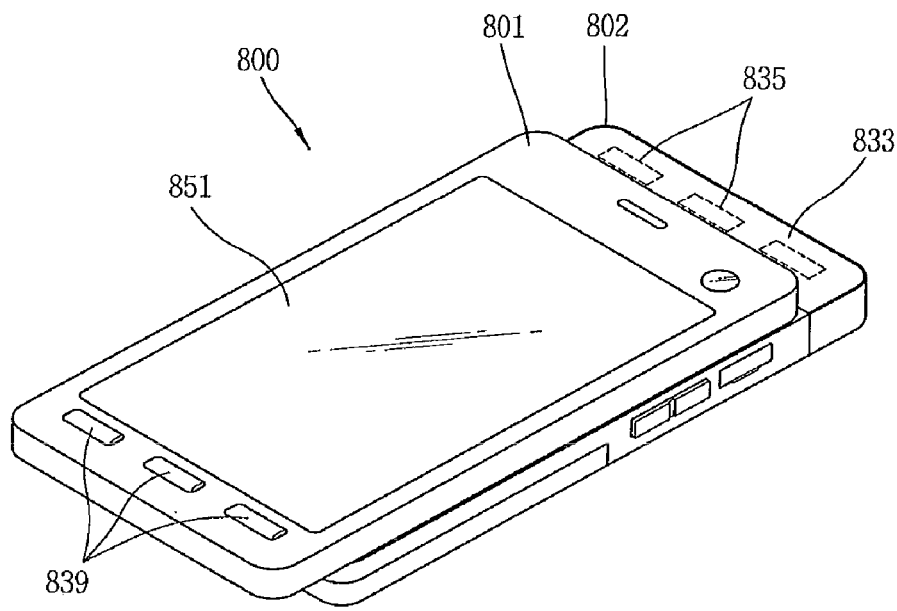
Figure 24C:
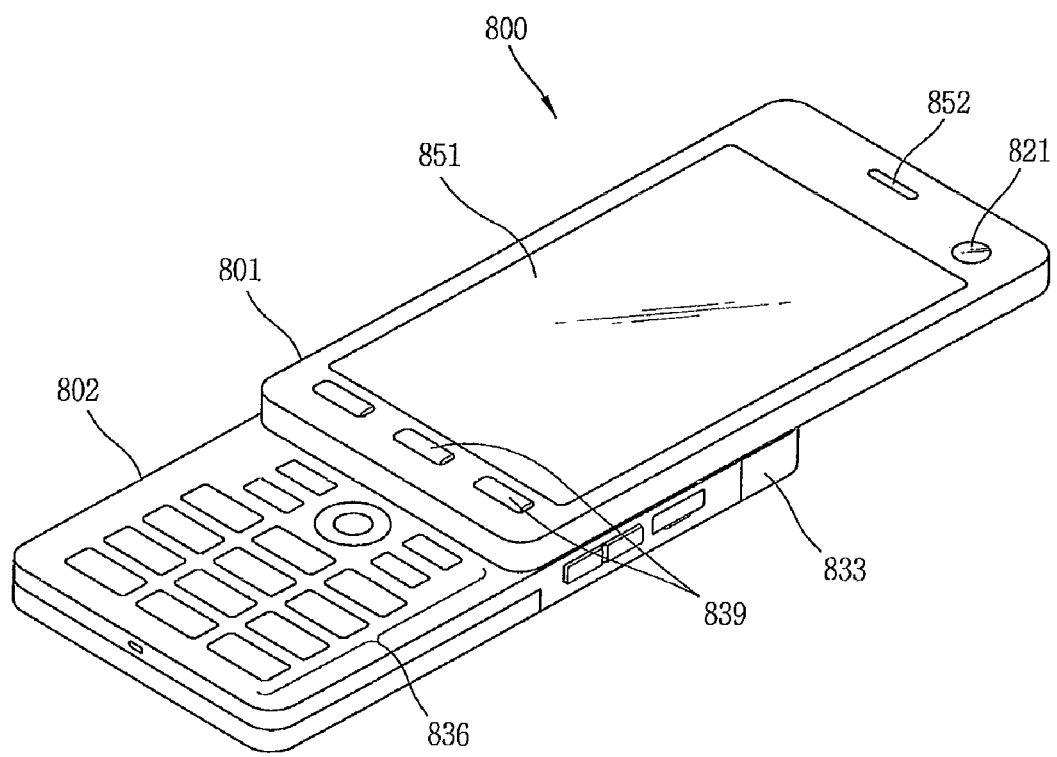

Next, FIGS. 24A to 24C are perspective views showing a portable terminal 800 with a transparent input module 833 in accordance with an embodiment of the present invention. As shown in FIGS. 24A to 24C, the portable terminal 800 includes a first terminal body 801 provided at its front surface with a display 851, an audio input unit 852, a video input unit 821, a manipulation unit 839 and the like, and a second terminal body 802 slidably coupled to the first terminal body 801. A transparent input module 833 configured to be transparent or semitransparent is also formed at an upper end of the second terminal body 802. The transparent input module 833 may include the configurations as aforementioned in FIGS. 4 to 15.

In a state of the first terminal body 801 is totally overlapped on the second terminal body 802 as shown in FIG. 24A, and if the first terminal body 801 is slightly slid down as shown in FIG. 24B, the transparent input module 833 overlapped on the second terminal body 802 is exposed. In addition, the first terminal body 801 may be configured to stop sliding at a location as shown in FIG. 24B. In this state, a user can input what he or she wants through the transparent input module 833 and also view an object located at the rear side through the transparent input module 833. Additionally, an aesthetic effect is enhanced.

Further, the transparent input module 833 may be used as keys for indicating functions or directions together with the manipulation unit 839 of the first terminal body 801, or be used as dedicated keys for instructing a function relating to, e.g., playing games in a game mode, image capturing or music file reproducing. If the first terminal body 801 is slid up to a certain distance as shown in FIG. 24C, a keypad 836 disposed on the second terminal body 802 for allowing inputting of numerals or letters is exposed. In this instance, the transparent input module 833 is obscured by the first terminal body 801, and may be thusly used as a light emitting element for providing a lighting effect rather than an input element.

The terminal according to embodiments of the present invention having a transparent input module remarkably enhances an aesthetic effect thereof. Further, various light effects or visual effects can be provided in the input module, thus to increase user convenience. The transparent input module is disposed at a front body to be obscured or exposed depending on an open position or closed position. Such configuration prevents a reduction of an installation space of other opaque components, thereby facilitating an implementation of a small and slim portable terminal. Thus, when manufacturing a portable terminal using a transparent material, the portable terminal can have an enhanced outer appearance. Further, embodiments of the present invention prevent the relative reduction of a space in which other opaque components are disposed.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:
1. A mobile terminal, comprising:
   a front body;
   a rear body slidably coupled to the front body such that the front and rear bodies are slidable between a closed position and an opened position, at least one of the front body and rear body including a transparent portion that can be seen through;
   a wireless communication unit disposed in the front body and configured to wirelessly communication with at least one other terminal; and
   a transparent input module disposed in the transparent portion and configured to input information into the mobile terminal.

2. The portable terminal of claim 1, wherein the rear body comprises:
a sliding portion configured to be slidably inserted and pulled out of the front body; and
a cover portion coupled to the sliding portion, and configured to be slidable along a rear surface of the front body.

3. The portable terminal of claim 2, wherein the transparent input module is disposed on a front surface of the sliding portion.

4. The portable terminal of claim 2, wherein the cover portion is coupled to the sliding portion and a receiving hole is formed between the sliding portion and the cover portion and configured to receive at least a part of the front body in the closed position.

5. The portable terminal of claim 1, wherein the transparent input module comprises:
a transparent protective layer; and
a touch sensitive layer disposed next to the transparent protective layer and configured to detect a touch input on the transparent input module.

6. The portable terminal of claim 5, wherein the transparent input module further comprises:
a transparent reinforced glass layer disposed next to the touch sensitive layer so as to support the touch sensitive layer and the transparent protective layer.

7. The portable terminal of claim 6, wherein the transparent reinforced glass layer includes at least one of a set of numerals, letters or marks corresponding to selectable input items of the transparent input module.

8. The portable terminal of claim 1, wherein the transparent input module comprises:
a transparent reinforced glass layer; and
a touch sensitive layer disposed next to the transparent reinforced glass layer and configured to detect a touch input on the transparent input module.

9. The portable terminal of claim 8, wherein the transparent reinforced glass layer includes at least one of a set of numerals, letters or marks corresponding to selectable input items of the transparent input module.

10. The portable terminal of claim 9, wherein said at least one of the set of numerals, letters or marks are carved into the transparent reinforced glass layer.

11. The portable terminal of claim 9, wherein the transparent input module further comprises:
an illuminating member configured to horizontally illuminate said at least one of the set of numerals, letters or marks.

12. The portable terminal of claim 11, wherein the transparent input module further comprises:
a light guiding sheet disposed inside of the transparent reinforced glass layer and configured to guide light illuminated from the illuminating member.

13. The portable terminal of claim 11, wherein the illuminating member is disposed inside the cover portion.

14. The portable terminal of claim 2, wherein the transparent input module further comprises:
a transparent display formed on the sliding portion or the cover portion and configured to output an image or illuminate light to a set of numerals, letters, or marks formed on an illuminating member disposed next to the transparent display.

15. The portable terminal of claim 2, further comprising:
an opaque covering member formed along edge portions of the sliding portion and the cover portion.

16. The portable terminal of claim 2, further comprising:
slide holes formed in the front body such that the slide holes guide the sliding portion in a longitudinal direction.

17. The portable terminal of claim 16, further comprising:
at least a pair of rollers attached to the slide holes and configured to support the sliding portion.

18. The portable terminal of claim 16, wherein the transparent input module further comprises:
slide rails formed on at least one of the front body and the rear body for guiding the sliding portion.

19. The portable terminal of claim 2, wherein the cover portion is configured to be transparent.

20. The portable terminal of claim 19, further comprising:
a battery disposed at a rear portion of the front body,
wherein the cover portion is detachably coupled to the rear body so as to replace the battery.

21. A portable terminal, comprising:
a main body;
a wireless communication unit disposed in the main body and configured to wirelessly communicate with at least one other terminal;
a transparent input module that can be seen through installed on an edge portion of the main body,
wherein the transparent input module comprises:
a transparent protective layer; and
a touch sensitive layer disposed inside the transparent protective layer and configured to detect a touch input on the transparent protective layer.

* * * * *